(12) United States Patent
Zhang et al.

(10) Patent No.: US 10,815,894 B2
(45) Date of Patent: Oct. 27, 2020

(54) MODULAR ACOUSTIC BLOCKS AND ACOUSTIC LINERS CONSTRUCTED THEREFROM

(71) Applicant: General Electric Company, Schenectady, NY (US)

(72) Inventors: Hua Zhang, Greer, SC (US); Richard Lynn Loud, Ballston Spa, NY (US); Valery Ivanovich Ponyavin, Greenville, SC (US)

(73) Assignee: General Electric Company, Schenectady, NY (US)

( * ) Notice: Subject to any disclaimer, the term of this patent is extended or adjusted under 35 U.S.C. 154(b) by 343 days.

(21) Appl. No.: 15/788,196

(22) Filed: Oct. 19, 2017

(65) Prior Publication Data

US 2019/0120143 A1 Apr. 25, 2019

(51) Int. Cl.
*F02C 7/24* (2006.01)
*F01N 1/02* (2006.01)
*F01N 1/00* (2006.01)

(52) U.S. Cl.
CPC .............. *F02C 7/24* (2013.01); *F01N 1/00* (2013.01); *F01N 1/023* (2013.01); *F05D 2230/51* (2013.01); *F05D 2260/96* (2013.01); *F05D 2260/963* (2013.01)

(58) Field of Classification Search
CPC .... F02C 7/24; F05D 2230/51; F05D 2260/96; F05D 2260/963; F01N 1/00; F01N 1/023
USPC ....... 181/213, 217, 222, 224, 225, 288, 292, 181/293
See application file for complete search history.

(56) References Cited

U.S. PATENT DOCUMENTS

| | | | | |
|---|---|---|---|---|
| 3,011,584 A * | 12/1961 | Lemmerman | ............. | B64F 1/26 181/217 |
| 3,692,140 A * | 9/1972 | Smith | ........................ | B64F 1/26 181/213 |
| 4,753,319 A * | 6/1988 | Vinciguerra | ............ | F01D 25/30 181/218 |
| 5,532,439 A * | 7/1996 | Minkin | ...................... | F01N 1/10 181/224 |
| 6,539,702 B2 * | 4/2003 | Nishimura | ............... | F01D 25/30 181/213 |
| 6,705,428 B2 * | 3/2004 | Kudernatsch | ........... | F01D 25/30 181/224 |
| 8,087,491 B2 * | 1/2012 | Merchant | ................ | F01D 25/30 181/224 |
| 8,931,588 B2 * | 1/2015 | Murray | ..................... | F02C 7/24 181/214 |
| 9,514,734 B1 | 12/2016 | Jones et al. | | |
| 9,624,791 B2 * | 4/2017 | Weir | ......................... | F01D 9/04 |

(Continued)

*Primary Examiner* — Jeremy A Luks
(74) *Attorney, Agent, or Firm* — Charlotte C. Wilson; James W. Pemrick

(57) ABSTRACT

An exhaust processing system that includes: an exhaust passageway for directing exhaust gases, the exhaust passageway having passageway walls that define and enclose the exhaust passageway between an upstream position and a downstream position; and an acoustic liner formed against and covering at least one of the passageway walls of the exhaust passageway. The acoustic liner may include uniformly configured modular acoustic blocks fitted against each other. The modular acoustic blocks each may include interior cavities having different lengths configured to dampen targeted sound frequencies.

19 Claims, 4 Drawing Sheets

(56) References Cited

U.S. PATENT DOCUMENTS

| | | | |
|---|---|---|---|
| 2005/0167193 A1* | 8/2005 | Van Reeth | E01F 8/0082 |
| | | | 181/293 |
| 2015/0059312 A1* | 3/2015 | Rajesh | F01N 1/085 |
| | | | 60/39.5 |
| 2018/0245516 A1* | 8/2018 | Howarth | F02C 7/045 |
| 2018/0258854 A1* | 9/2018 | Sidelkovskiy | F02C 7/045 |

* cited by examiner

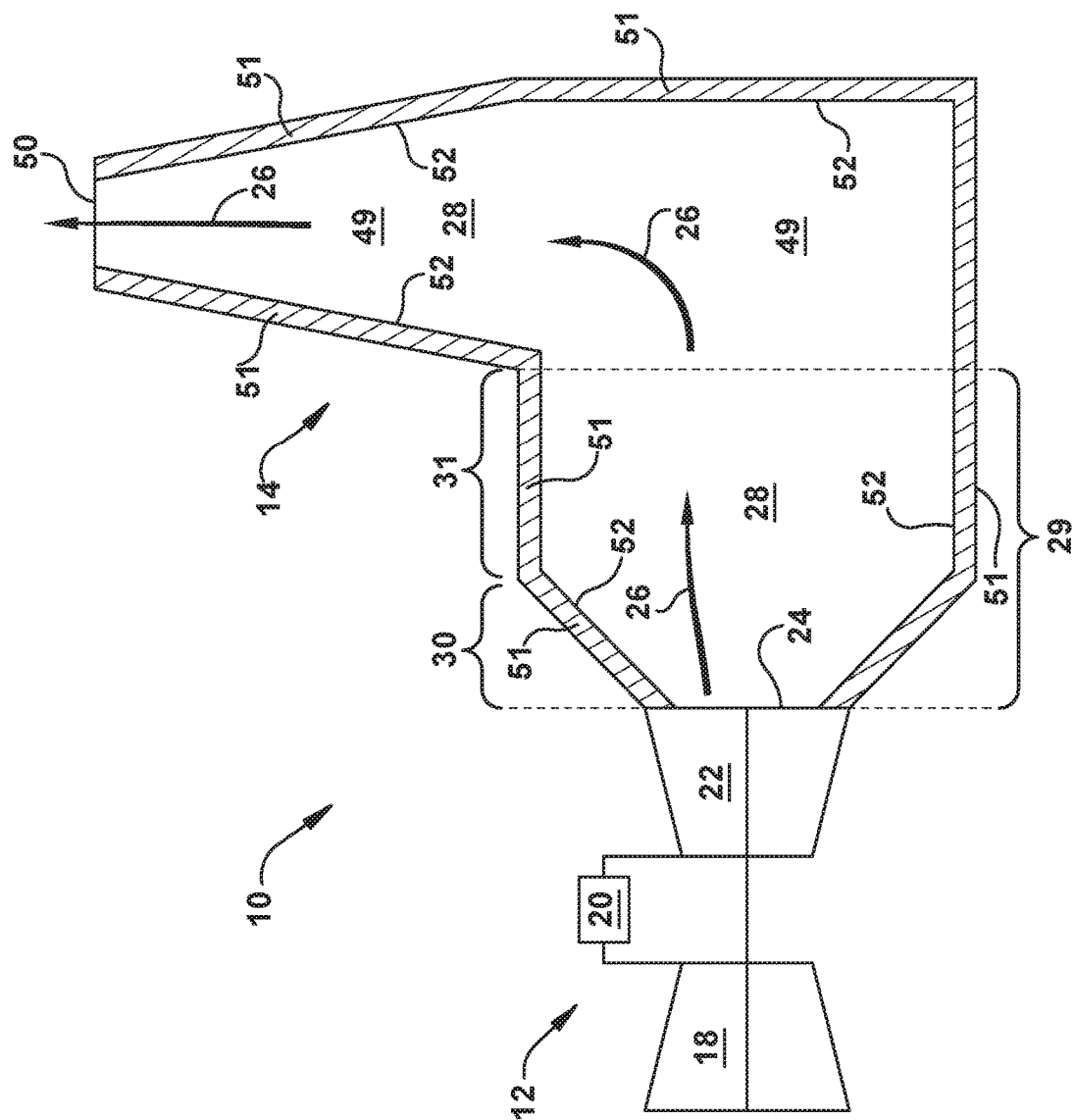

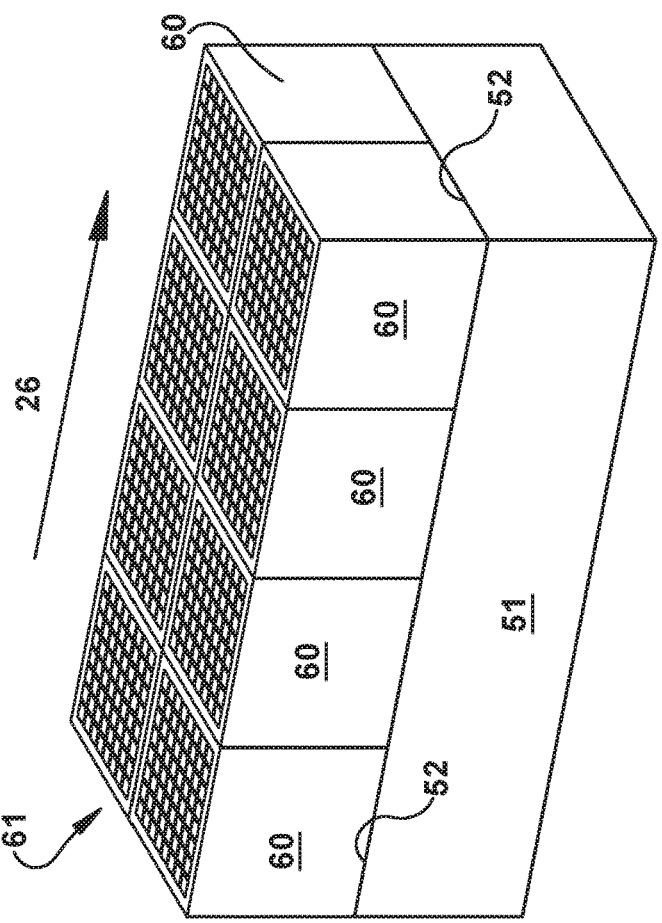
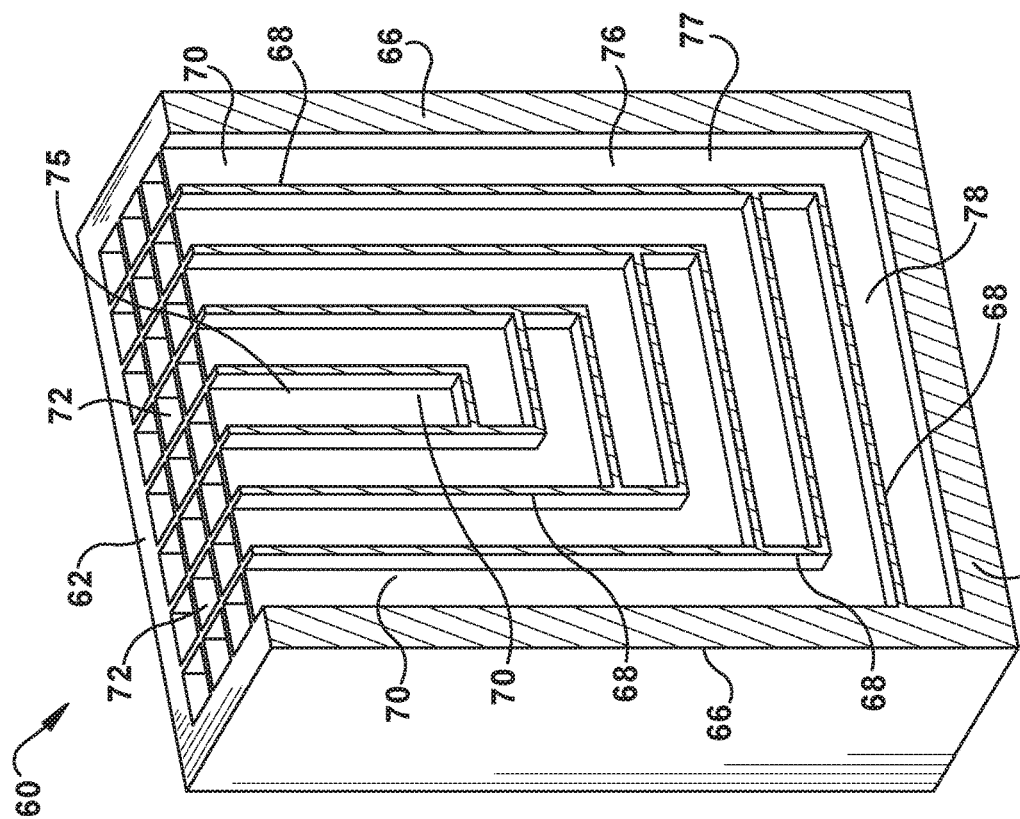
Figure 5
Figure 4

MODULAR ACOUSTIC BLOCKS AND ACOUSTIC LINERS CONSTRUCTED THEREFROM

BACKGROUND OF THE INVENTION

The subject matter disclosed herein relates to acoustic liners for attenuating sound in exhaust passageways of industrial machines and, more particularly, but not by way of limitation, modular acoustic blocks for constructing such acoustic liners for use within the exhaust systems of combustion or gas turbine engines.

Combustion or gas turbine engines typically generate significant noise during operation. The noise levels may be regulated in certain environments and compliance with such regulations typically requiring costly and often inefficient solutions. For example, acoustic panels or liners may be employed at various locations of the turbine system, such as within the diffuser or exhaust duct or the stack. The material and geometry of such acoustic liners drive the absorption characteristics associated with dampening sound. Often, frequencies associated with operation of the turbine system require thicker or longer acoustic liners to adequately dampen the sound. Such increasing in size of the acoustic liner results in more expensive liners due to the additional required material. Furthermore, lengthening the acoustic liner undesirably increases the overall length (i.e., footprint) of the gas turbine engine, which adds cost, whereas thicker liners result in more pressure drop, which may negatively impact the overall efficiency of the gas turbine engine. Further, conventional acoustic liners are difficult to construct or modify once installed, which further add costs.

BRIEF DESCRIPTION OF THE INVENTION

The present invention thus describes an exhaust processing system that includes: an exhaust passageway for directing exhaust gases, the exhaust passageway having passageway walls that define and enclose the exhaust passageway between an upstream position and a downstream position; and an acoustic liner formed against and covering at least one of the passageway walls of the exhaust passageway. The acoustic liner may include uniformly configured modular acoustic blocks fitted against each other. The modular acoustic blocks each may include interior cavities having different lengths configured to dampen targeted sound frequencies.

The present invention further describes an acoustic liner that includes uniformly configured modular acoustic blocks fitted against each other. The modular acoustic blocks each may include exterior and interior walls. For each of the modular acoustic blocks, the exterior walls include opposing face and aft walls and, extending between the face and aft walls, sidewalls. For each of the modular acoustic blocks, the interior walls may extend between the exterior walls and divide an interior of the modular acoustic block into interior cavities that extend lengthwise between respective openings defined through the face wall and respective termination points defined within the interior of the modular acoustic block. The interior cavities may have lengths that are varied across a range of lengths for dampening a targeted range of sound frequencies.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 is a block diagram of a gas turbine engine that includes an exhaust processing system within which embodiments of the present invention may be used;

FIG. 4 is a sectioned perspective view of a modular acoustic block according to alternative embodiments of the present invention;

FIG. 5 is an assembled view of an acoustic liner as may be constructed by the modular acoustic blocks according with exemplary embodiments of the present invention.

DETAILED DESCRIPTION OF THE INVENTION

Figure 3:
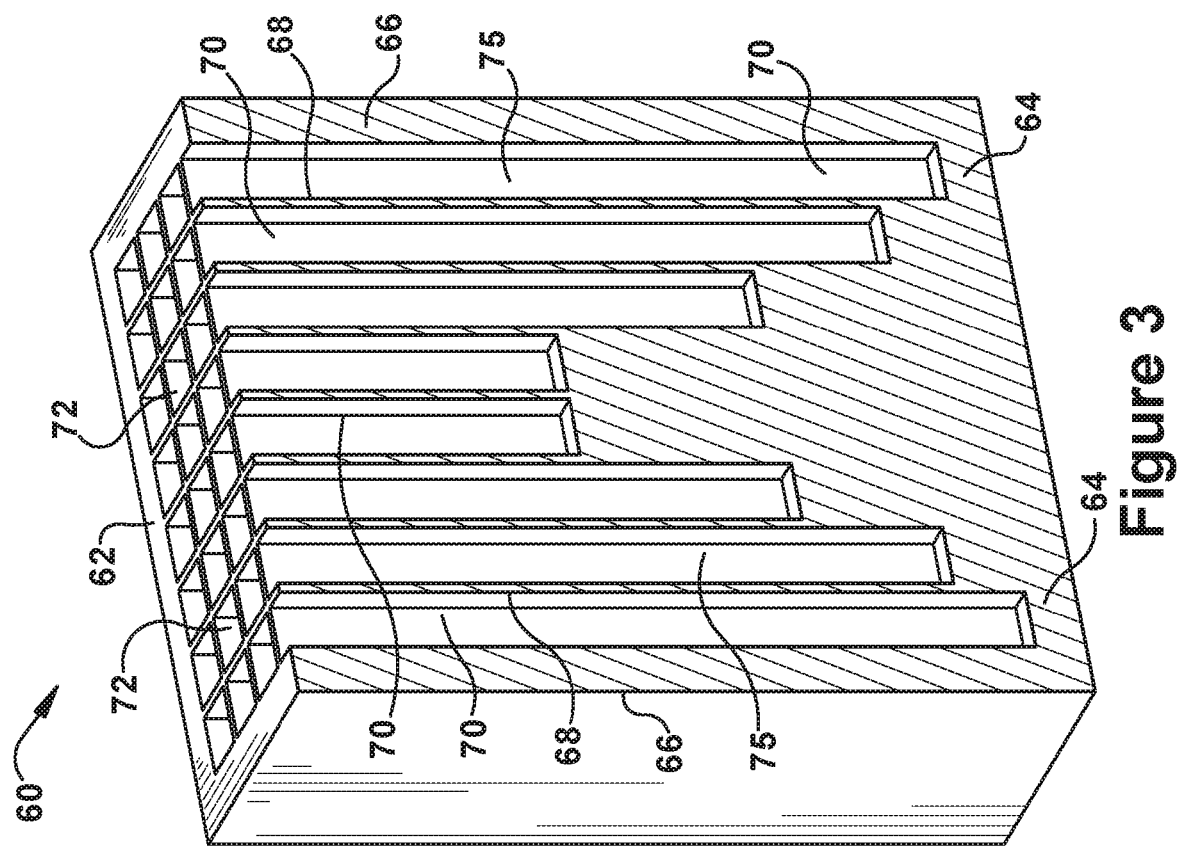
FIG. 3 is a sectioned perspective view of a modular acoustic block according to exemplary embodiments of the present invention.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment" or "an embodiment" of the present invention are not intended to be interpreted as excluding the existence of additional embodiments that also incorporate the recited features.

With the foregoing in mind, FIG. 1 is a schematic diagram of an exemplary gas turbine system 10 that includes both a gas turbine engine 12 that is operably connected to an exhaust processing system 14. The gas turbine system 10, for example, may be a power generating plant. As shown, the gas turbine engine 12 includes a compressor 18, combustor 20, and turbine 22. The turbine 22 may be drivingly coupled to the compressor 18 (and, not shown, a generator) via a shaft. In operation, air enters the gas turbine engine 12 through an air intake section, is pressurized within the compressor 18. To do this, the compressor 18 may include a plurality of compressor blades that are coupled to the shaft. The rotation of the shaft causes the rotation of the compressor blades, thereby drawing air into the compressor 18 and compressing the air prior to the air being passed along to the combustor 20.

Within the combustor 20, the compressed air is mixed with fuel and combusted. The combustor 20 may include one or more fuel nozzles that inject a fuel-air mixture into the combustor in a suitable ratio for optimal combustion, emissions, fuel consumption, power output, and so forth. The combustion of the air and fuel may generate hot pressurized gas, which may then be utilized to drive one or more turbine blades within the turbine 22. In operation, the combustion gases flowing into and through the turbine 22 flow against and between the turbine blades, thereby driving the turbine blades and, thus, the shaft to rotate and drive a load, such as an electrical generator. As stated above, the rotation of the shaft induced by the turbine 22 may rotate the blades within the compressor 18, and in this manner, air is drawn into the gas turbine engine 12 to continue the cycle.

The combustion gases that are expanded through the turbine 22 generally exit as a stream of exhaust gas 26 via a downstream outlet 24 at the aft end of the turbine 22. From the downstream outlet 24, the exhaust gas 26 may continue to flow downstream towards and through the exhaust processing system 14. For example, the downstream outlet 24 of the turbine 22 may be fluidly coupled to the exhaust processing system 14 and an exhaust passageway 28 defined therethrough. The exhaust passageway 28 may include an exhaust duct 29. The exhaust duct 29 may include an upstream section, which will be referred to herein as a transition section 30, as well as a subsequent section that follows the transition section 30, which will be referred to herein as a downstream section 31. As will be appreciated, the transition section 30 is so-called because it is configured so to increase or transition the cross-sectional flow area of the exhaust duct 29 from a smaller cross-sectional area near the downstream outlet 24 of the turbine 22 to a larger cross-sectional flow area. This larger cross-sectional flow area, as illustrated, may extend through the downstream section 31 of the exhaust duct 29. As indicated, the downstream section 31 may include a substantially constant cross-sectional flow area that extends between the transition section 30 and a stack 49. The exhaust gas 26 may continue through the stack 49 to a vent to atmosphere or vent 50, where the exhaust gas is emitted to atmosphere.

Constructed in this manner, it will be appreciated that the exhaust duct 29 and the stack 49 may be described, for purposes herein, as including passageway walls 51 that collectively define and enclose an exhaust passageway 28 through which the exhaust gases 26 are channeled by operation of the exhaust processing system 14. As used herein, the interior surfaces 52 of the passageway walls 51 are those that face the interior of the exhaust passageway 28. This enclosed exhaust passageway 28 may extend continuously from an upstream beginning, which is the downstream outlet 24 of the turbine 22, through to a downstream termination point, which is the vent 50 of the stack 49 where the exhaust gas 26 is exhausted to atmosphere. As will be seen, the following discussion introduces and describes an acoustic liner, which, pursuant to aspects of the present invention, may be efficiently constructed via uniformly configured modular acoustic blocks 60. This acoustic liner 61 can be used to cover one or more of the interior surfaces 52 of one or more of the passageway walls 51 of the exhaust passageway 28 through the exhaust processing system 14 in order to absorb and reduce the noise produced by the gas turbine engine 12 during operation.

Figure 2:
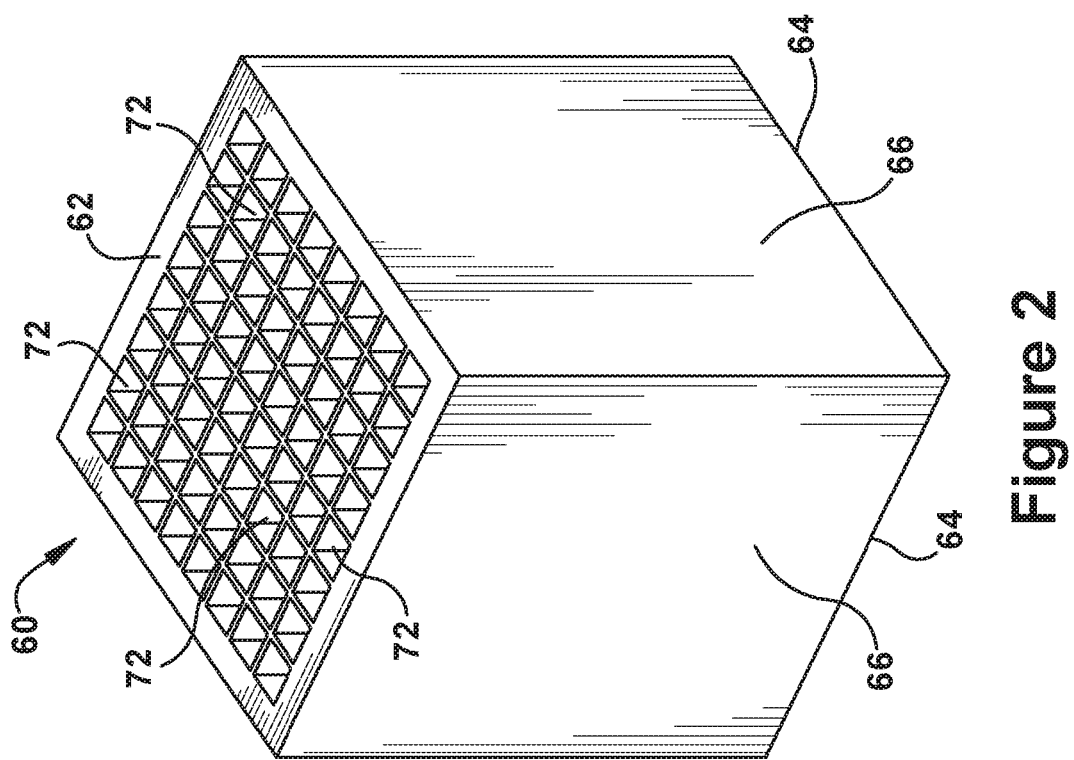
FIG. 2 is a perspective view of a modular acoustic block that may be assembled into an acoustic liner according to exemplary embodiments of the present invention.

With reference now to FIGS. 2 through 4, perspective views are provided of modular acoustic blocks 60 that, in accordance with embodiments of the present invention, may be efficiently assembled, stacked or fitted against each other so to form an acoustic liner 61. As will be seen, FIG. 2 provides a perspective view of an exemplary modular acoustic block 60, while FIGS. 3 and 4 provide perspective views of exemplary modular acoustic blocks 60 that have been sectioned to demonstrate alternative interior configurations in accordance with embodiments of the present invention. An example of an acoustic liner 61 will be discussed in more detail in relation to FIG. 5.

In regard to the modular acoustic blocks 60, each may be configured as a discrete modular unit that is shaped to allow efficient assembly or stacking with other uniformly shaped blocks so to form a continuous acoustic liner 61. As used herein, a continuous acoustic liner refers to a liner that completely covers a predefined or target contiguous surface area. Thus, according to preferred embodiments, the cross-sectional shape of the modular acoustic block 60 may be that of a polygon that has a shape that can be used to "tile a plane" with no overlaps or gaps. Such shapes may include, for example, a rectangle, a triangle, or a hexagon. In this manner, a multitude of the modular acoustic blocks 60 may be fitted together so to form an acoustic liner 61 that completely covers a targeted surface area—as may be defined, for example, on the interior surfaces 52 of the passageway walls 51 that define an exhaust passageway 28—such that no overlaps or gaps occur between adjacent modular acoustic blocks 60. In accordance with preferred embodiments—as shown in the FIGS. 2 through 4—the modular acoustic blocks 60 each may be shaped as a cube or, more generally, a rectangular cuboid.

The modular acoustic block 60 may be described in relation to the exterior walls that define its shape, and, particularly, the manner in which features related to these exterior walls provide the desired functionality for the modular unit. As indicated on the figures, the modular acoustic blocks 60 each may include a pair of opposing exterior walls, which are referred to herein as a face wall 62 and aft wall 64. The face wall 62 is so-called because it includes the exterior surface of the modular acoustic block 60 that, upon installation, faces toward the interior of the exhaust passageway 28. Thus, during operation, it is the exterior surface of the face wall 62 that is directed toward the exhaust gases 26 flowing through the exhaust passageway 28. Being opposite the face wall 62, the aft wall 64 includes the exterior surface of the modular acoustic block 60 that, upon installation, is adjacent to or faces the passageway wall 51 of the exhaust passageway 28 against which the acoustic liner 61 is formed. This being the case, it will be appreciated that, for installation purposes, it may be the exterior surface of the aft wall 64 that mounts or connects the modular acoustic block 60 to the interior surface 52 of one of the passageway walls 51. According to preferred embodiments, the exterior surfaces of the face wall 62 and aft wall 64 are flat or planar surfaces, and may be oriented so to be parallel to each other.

The other exterior walls of the modular acoustic block 60 are the lateral walls, which are referred to herein as side walls 66. As will be appreciated, the side walls 66 extend generally between the face wall 62 and aft wall 64. As such, it will be appreciated that, once installed, it is the side walls 66 of a modular acoustic block 60 that abuts or resides adjacent to the side walls 66 of other neighboring or adjacent modular acoustic blocks 60.

As will be seen, the aft wall 64 and the side walls 66 may be constructed having solid exterior surfaces, while the face wall 62 includes multiple discrete openings formed through it. The aft wall 64 and side walls 66 may be constructed using a rigid material, and these walls may provide structural support to the modular acoustic block 60 as well as the acoustic liners 61 formed from such blocks. Thus, in regard to the exterior surfaces of the modular acoustic block 60, it should be understood that the exterior surfaces of the face wall 62 and aft wall 64 represent the ends of the block 60 that, respectively, face the interior of the exhaust passageway and the passageway wall 51, while the exterior surfaces of the side walls 66 define the cross-sectional shape of the modular acoustic block 60 and that, upon installation, engage the sidewalls of those modular acoustic blocks 60 that surround it in the acoustic liner 61.

Along with how the exterior walls are configured, the modular acoustic block 60 of the present invention may be described relative to the manner in which the interior walls 68 define the interior spaces within the blocks 60. In general, the interior walls 68 include several intersecting walls that divide the interior of the modular acoustic block 60 into multiple interior cells or, as used herein, interior cavities 70. These interior walls 68 may be substantially solid and extend across the interior of the modular acoustic block 60, for example, between opposing side walls 66 as well as between the opposing face wall 62 and aft walls 64. As depicted, the interior walls 68 may be substantially thinner than the exterior walls that form the aft wall 64 and side walls 66. As will be seen, the interior walls 68 may be specifically configured to divide the interior of the modular acoustic block 60 into similarly shaped interior cavities 70 having a predetermined size, cross-sectional shape, and/or length. The geometrical arrangement of the interior cavities 70 may be varied in order to promote the absorption of sound across a broad range of anticipated or targeted sound frequencies.

As shown in FIG. 3, the interior cavities 70 may extend lengthwise from an opening 72 defined through the exterior surface of the face wall 62. From that the opening 72, the interior cavities 70 may extend partially or fully across the interior and connect to the aft wall 64. The face wall 62 may remain substantially open due to the multiple openings 72 formed therethrough, the number of which corresponds to the number of interior cavities 70. Given the intersecting geometrical arrangement of the interior walls 68, the openings 72 of the interior cavities 70 may form a lattice-like configuration at the exterior surface of the face wall 62. That is, the interior walls 68 being arranged so that their intersection forms a repeating uniform cross-sectional shape and size, such as the exemplary square that is shown, which gives the exterior surface of the face wall 62 this lattice-like appearance.

The size and shape of the interior cavities 70 generally control the amount and type of acoustic absorption that occur through the modular acoustic block 60 and, thus, the acoustic liner 61 that is formed from the arrangement of such modular acoustic blocks 60. According to preferred embodiments, as described, the interior cavities 70 may extend into the interior of the modular acoustic block 60 from respective openings 72 formed through the exterior surface of the face wall 62. As it extends into the interior of the modular acoustic block 60, each of the interior cavities 70 may maintain the cross-sectional shape and size of the openings 72 from which it originated. As illustrated, the cross-sectional shape of the interior cavities 70 may be generally rectangular or square, though other shapes are also possible. For example, other possible embodiments of the present invention include interior cavities 70 having a triangular or hexagonal cross-sectional shape. The interior cavities 70 may be configured so that their lengths vary, with the nature and extent of the variation being configured so that the modular acoustic block 60 preferably absorbs sound across a broad targeted frequency range. For example, the broad band of frequencies absorbed by exemplary embodiments may range between 400-3,000 Hz, but any other desired frequency ranges many be absorbed depending on the volume and thickness constraints of the modular acoustic block 60 and the architecture of the interior cavities 72.

As further shown in FIG. 3, each of the interior cavities 70 extend along a longitudinal axis that is straight or linear. Thus, each of these exemplary interior cavities 70 may be described as extending from an opening 72 formed through the exterior surface of the face wall 62 along a linear path to a point where the modular acoustic block 60 terminates within the interior of the modular acoustic block 60. As depicted, in accordance with exemplary embodiments, the position of this "termination point" of the interior cavities 70 may be varied across the thickness of the modular acoustic block 60 so that the length of the interior cavities 70 varies, which, as described, may be done to broaden the range of acoustic absorption characteristics of the modular acoustic blocks 60. Configured in this way, the linear interior cavities 75 may generally be described as having a long single chamber, which is linearly oriented lengthwise in a direction that is approximately perpendicular to the exterior surface of the face wall 62 of the modular acoustic block 60. Such interior cavities 70—i.e., those formed according to this linear configuration—may be referred to herein as "linear interior cavities 75". Other shapes and orientations of such interior cavities 70 are also possible in accordance with alternative embodiments.

As illustrated in FIG. 4, the interior cavities 70 of the present invention may further be configured to bend or have a bent configuration, and such interior cavities 70 may be referred to as "bent interior cavities 76". By using this bent configuration, it will be appreciated that longer overall lengths for the interior cavities 70 may be achieved, which may increase range of acoustic absorption, particularly in relation to lower frequencies, without needing to increase the overall thickness of the modular acoustic block 60. (As used herein, the thickness of the modular acoustic block 60 refers to the distance between the face wall 62 and the aft wall 64.) Thus, the bent configuration may be used to create interior cavities having a cavity length that is greater than the thickness of the modular acoustic block 60. In this way, the thickness of the acoustic liner 61 needed to dampen a targeted frequency range may be minimized, which, in turn, will minimize the pressure losses occurring through the exhaust passageway 28 due to the thickness of the acoustic liner 61. As described herein, the bent interior cavities 76 are defined in relation to the two connected chambers that form them: a first chamber 77, which extends from one of the openings 72 and is oriented approximately perpendicular to the exterior surface of the face wall 62; and a second chamber 78, which is oriented approximately parallel to the exterior surface of the face wall 62. The two chambers 77, 78 of the bent interior cavities 76 are connected via a turn or bend of approximately 90 degrees. Other orientations for the bent interior cavities 76 are also possible.

As also depicted in FIG. 4, in order to achieve even greater variance between the lengths of the interior cavities 70, the modular acoustic block 60 of the present invention may include both types of interior cavities 70, i.e., both linear interior cavities 75 and bent interior cavities 76. As will be appreciated, the length of one of the linear interior cavities 75 is simply derived as the distance of the single chamber the forms it, i.e., the distance between the opening 72 of the linear interior cavity 75 to its termination point within the interior of the block 60. In regard to the bent interior cavities 76, the length may be calculated as the combined length of the first and second chambers 77, 78 that make up the bent interior cavity 76. Using these definitions, according to preferred embodiments, the modular acoustic block 60 may be configured such that the interior cavities 70 (which may include straight and/or bent interior cavities 75, 76) have lengths varied between 0.5 to 15 inches. As further shown in FIG. 4, with the bend of the bent interior cavities 76 being a 90° angle, the interior cavities 75, 76 may be packaged in such a way as to maximize the use of the available volume of the modular acoustic block 60. In this way, the longest interior cavities 70 may have a length that is almost twice that of the total thickness of the modular acoustic block 60. It should be understood that various other geometries for the interior cavities 70 are also possible, including, but not limited to, curved cavities, cavities having an "S" shape, cavities having irregular shapes that vary in thickness from one part of the cavity to another, etc. Also, in various embodiments, any suitable dimensions, cavity lengths, and cross-sectional shapes may be used.

As will be appreciated, the temperature associate with the exhaust gases 26 of gas turbine engines is sufficiently high to require the use of specially selected materials for constructing the modular acoustic blocks 60. For example, ceramic matrix composite ("CMC") material has been demonstrated as capable of handling such high temperatures, and can be formed into the necessary shapes for use in making the modular acoustic blocks 60 of the present invention. Metallic materials also may be used, such as steel or stainless-steel alloys, as one of ordinary skill in the art would appreciate.

With specific reference now to FIG. 5, an assembled view of an acoustic liner 61 is provided that demonstrates how an acoustic liner 61 is constructed using the modular acoustic blocks 60 of the present invention. As shown, the acoustic liner 61 is assembled via a single layer of the modular acoustic blocks 60, with this single layer being fitted against each other as well as against one of the passageway walls 51 of an exhaust passageway 28 within the exhaust processing system 14. The single layer of modular acoustic blocks 60 provides a continuous acoustic liner 61 that has a uniform thickness. As discussed, the thickness of the modular acoustic block 60 may be minimized so that the pressure loss through the exhaust passageway 28 attributable to the thickness of the acoustic liner 61 is also minimized. Alternatively, multiple layers of the modular acoustic blocks 60 may also be used.

For the purposes of describing how the modular acoustic blocks 60 are positioned or fitted against each other to construct the acoustic liner 61, it may be helpful to refer to the modular acoustic blocks 60 within the acoustic liner 61 pursuant to a discrete arrangement or, as used herein, a "cluster" of the blocks 60 that is repeated throughout the acoustic liner 61. As used herein, this cluster includes a particular modular acoustic block of the liner 61 being designated as a "center one" of the modular acoustic blocks 61 and then designating those modular acoustic blocks 60 that surround and are adjacent to the "center one" as "adjacent ones" of the modular acoustic blocks 60. Using these designations, the acoustic liner 61 then may be described as a repeated configuration in which the sidewalls of the "center one" of the modular acoustic blocks 60 abuts a corresponding one of the sidewalls of the "adjacent ones" of the modular acoustic blocks 60.

According to alternative embodiments, the modular acoustic blocks 60 may be used to construct an acoustic liner 61 against any of the interior surfaces 52, in whole or in part, of any of the passageway walls 51 that define and enclose an exhaust passageway 28 through an exhaust processing system 14. As described above, the exhaust passageway 28 may generally be described as extend continuously between an upstream position (which, for example, may be the downstream outlet 24 of the turbine 22) and a downstream position (which, for example, may be the vent 50 of the stack 49). More particularly, according to preferred embodiments, the acoustic liner 61 of the present invention may be formed against and adjacent to one or more of the passageway walls 51 enclosing the exhaust passageway 28 through the exhaust duct 29. For example, this may include the transition section 30, the downstream section 31, or both the transition section 30 and the downstream section 31 portions of the exhaust duct 29. Alternatively, the acoustic liner 61 of the present invention may also be constructed against and adjacent to one or more of the passageway walls 51 enclosing the portion of the exhaust passageway 28 that extends through the stack 49 of the exhaust processing system 14. Also, the acoustic liner 61 of the present invention may be constructed against and adjacent to one or more of the passageway walls 51 enclosing the exhaust passageway 28 formed through both the exhaust duct 29 and the stack 49 of the exhaust processing system 14.

Figure 6:
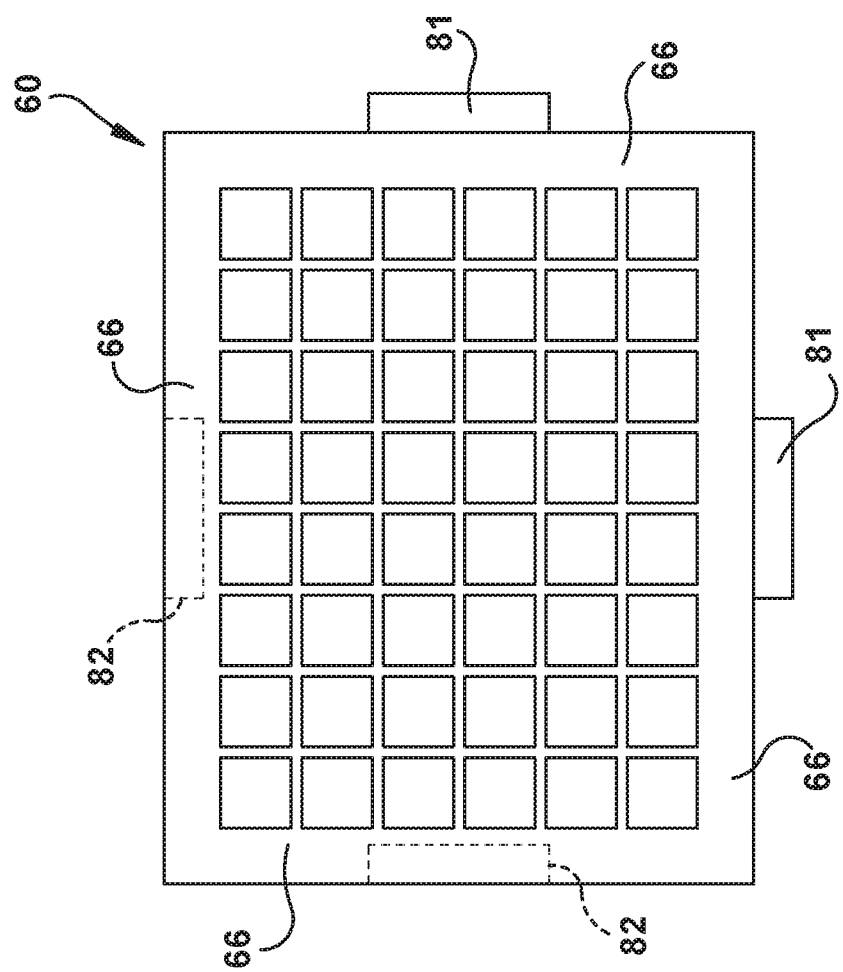
FIG. 6 is a top view of a modular acoustic block that includes an interlocking mechanism for securing the modular acoustic block to neighboring or adjacent blocks.

FIG. 6 shows a top view of an alternative embodiment of the modular acoustic block 60 in which an interlocking mechanism is provided to secure modular acoustic blocks 60 that are adjacent to each other in the acoustic liner 61. As illustrated, according to a preferred embodiment, the interlocking mechanism includes a tab 81 and slot 82 configuration. For example, tabs 81 are formed that protrude from two of the side walls 66 of the modular acoustic block 60, while slots 82—which correspond to the tabs 81—are formed within the other two side walls 66 of the exemplary modular acoustic block 60. The tabs 81 and slots 82 then may be used to properly align the modular acoustic blocks 60 to neighboring modular acoustic blocks 60 during the installation or stacking process. If described in relation to the "cluster" of modular acoustic blocks 60 that is introduced above, the interlocking mechanism may be said to connect the center one of the modular acoustic blocks 60 to the adjacent ones of the modular acoustic blocks 60. More specifically, the tab and slot of the center one of the modular acoustic blocks 60 are adapted to cooperate with the slot and tab, respectively, of the adjacent ones of the modular acoustic blocks 60. Once installed, the tabs 81 and slots 82 provide a locking and support mechanism that resists certain types of relative movement between neighboring blocks 60. In this way, the acoustic liner 61 may be structurally enhanced. The present invention anticipates the use of other types of interlocking mechanisms for achieving similar results.

While the present invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

We claim:

1. An exhaust processing system comprising:
an exhaust passageway for directing exhaust gases, the exhaust passageway comprising passageway walls that define and enclose the exhaust passageway between an upstream position and a downstream position; and
an acoustic liner formed against and covering at least one of the passageway walls of the exhaust passageway;
wherein the acoustic liner comprises uniformly configured modular acoustic blocks fitted against each other;
wherein a cluster of the modular acoustic blocks is repeated throughout the acoustic liner, the cluster comprising:
a center one of the modular acoustic blocks; and
adjacent ones of the modular acoustic blocks that surround and are adjacent to the center one of the modular acoustic blocks;
wherein, within the cluster, each sidewall of the sidewalls of the center one of the modular acoustic blocks abuts a corresponding one of the sidewalls of the adjacent ones of the modular acoustic blocks;
wherein each modular acoustic block of the modular acoustic blocks comprises an interlocking mechanism that, within the cluster, connects the center one of the modular acoustic blocks to the adjacent ones of the modular acoustic blocks; and
wherein the interlocking mechanism comprises a tab protruding from a first one of the sidewalls and a slot formed within a second one of the sidewalls, the tab and slot of the center one of the modular acoustic blocks being adapted to cooperate with the slot and tab, respectively, of the adjacent ones of the modular acoustic blocks;
wherein each modular acoustic block of the modular acoustic blocks comprises exterior and interior walls;
wherein the exterior walls comprise walls having an exterior surface, the exterior walls including:
opposing face and aft walls; and
sidewalls that extend between the face and aft walls;
wherein the interior walls of each modular acoustic block of the modular acoustic blocks comprises walls extending between the exterior walls to divide an interior of the modular acoustic blocks into interior cavities having different lengths configured to dampen targeted sound frequencies.

2. The exhaust processing system according to claim 1, wherein the exhaust processing system is operably connected to a gas turbine engine for receiving the exhaust gases produced by the gas turbine engine;
wherein the exhaust passageway comprises an exhaust duct and a stack;
wherein the exhaust duct comprises axially stacked sections in which a transition section is followed by a downstream section, wherein:
the transition section is configured to expand a cross-sectional flow area through the exhaust duct relative to axial position; and
the downstream section is configured to extend between the transition section and the stack with a substantially constant cross-sectional flow area; and
wherein the stack extends between the exhaust duct and a vent to atmosphere;
wherein the upstream position and downstream position between which the exhaust passageway extends comprise a downstream outlet of the gas turbine engine and the vent to atmosphere, respectively.

3. The exhaust processing system according to claim 1, wherein each modular acoustic block of the modular acoustic blocks includes:
the exterior surface of the face wall being planar;
the exterior surface of the aft wall being planar and approximately parallel to the planar exterior surface of the face wall; and
the sidewalls defining a cross-sectional shape of each modular acoustic block of the modular acoustic blocks that is constant between the face wall and the aft wall.

4. The exhaust processing system according to claim 1, wherein the acoustic liner comprises the modular acoustic blocks being fitted against each other such that:
the exterior surface of the face wall of each of the modular acoustic blocks faces toward the interior of the exhaust passageway; and
the exterior surface of the aft wall of each of the modular acoustic blocks faces toward and resides adjacent to the at least one of the passageway walls of the exhaust passageway against which the acoustic liner is formed.

5. The exhaust processing system according to claim 1, wherein the exterior surface of the aft wall of each of the modular acoustic blocks connects to an interior surface of the at least one of the passageway walls of the exhaust passageway against which the acoustic liner is formed; and
wherein the acoustic liner comprises a single layer of the modular acoustic blocks fitted together such that the sidewalls of adjacently placed ones of the modular acoustic blocks abut such that no gaps remain therebetween.

6. The exhaust processing system according to claim 3, wherein the cross-sectional shape of each modular acoustic block of the modular acoustic blocks comprises a polygon having three or more linear sides, each of the three or more linear sides corresponding to one of the sidewalls; and
wherein each modular acoustic block of the modular acoustic blocks includes the interior cavities extending lengthwise between respective openings defined through the exterior surface of the face wall and respective termination points defined within the interior of the modular acoustic block.

7. The exhaust processing system according to claim 6, wherein, for each modular acoustic block of the modular acoustic blocks, the openings through the exterior surface of the face wall comprise a lattice configuration in which:
the openings comprise a uniform cross-sectional shape and area; and
the openings are arranged in rows.

8. The exhaust processing system according to claim 2, wherein the at least one of the passageway walls against which the acoustic liner is formed comprises the passageway walls within the exhaust duct; and
wherein the targeted sound frequencies comprise a range of between 400-3,000 Hz.

9. The exhaust processing system according to claim 2, wherein the at least one of the passageway walls against which the acoustic liner is formed comprises the passageway walls within each of the transition section and the downstream section of the exhaust duct.

10. The exhaust processing system according to claim 2, wherein the at least one of the passageway walls against which the acoustic liner is formed comprises the passageway walls within each of the exhaust duct and the stack; and wherein each modular acoustic block of the modular acoustic blocks is constructed from at least one of a ceramic matrix composite material and a stainless-steel alloy.

11. An exhaust processing system comprising:
an exhaust passageway for directing exhaust gases, the exhaust passageway comprising passageway walls that define and enclose the exhaust passageway between an upstream position and a downstream position; and
an acoustic liner formed against and covering at least one of the passageway walls of the exhaust passageway;
wherein the acoustic liner comprises uniformly configured modular acoustic blocks fitted against each other;
wherein each modular acoustic block of the modular acoustic blocks comprises exterior and interior walls;
wherein the exterior walls comprise:
    a face wall having a planar exterior surface;
    an aft wall having a planar exterior surface that is approximately parallel to the planar exterior surface of the face wall; and
    sidewalls that extend between the face and aft walls and that each define a cross-sectional shape of each modular acoustic block of the modular acoustic blocks that is constant between the face wall and the aft wall;
wherein the interior walls of each modular acoustic block of the modular acoustic blocks comprises walls extending between the exterior walls to divide an interior of the modular acoustic blocks into interior cavities having different lengths configured to dampen targeted sound frequencies;
wherein, for each modular acoustic block of the modular acoustic blocks:
the interior cavities maintain the uniform cross-sectional shape and area of the openings as the interior cavities extend into the interior of the modular acoustic block;
the different lengths of the interior cavities comprise the termination points of the interior cavities being varied relative to a thickness of the modular acoustic block, the thickness of the modular acoustic block comprising a distance between the face wall and the aft wall; and
the polygon comprises a shape that can tile a plane with no overlaps or gaps.

12. The exhaust processing system according to claim 11, wherein each modular acoustic block of the modular acoustic blocks comprises a rectangular cuboid; and
wherein, for each of the modular acoustic blocks:
the uniform cross-sectional shape of the openings comprises a rectangle; and
wherein each of the exterior surfaces of the aft wall and the sidewalls comprises solid surfaces.

13. The exhaust processing system according to claim 11, wherein, for each modular acoustic block of the modular acoustic blocks, the interior cavities comprise linear interior cavities and bent interior cavities;
wherein each of the linear interior cavities comprises a single chamber formed about a linear axis that is oriented lengthwise in a direction that is approximately perpendicular to the exterior surface of the face wall; and
wherein each of the bent interior cavities comprises two connected chambers in which a first chamber is followed by a second chamber, wherein:
the first chamber is formed about a linear axis extending between a first end, which is defined by one of the openings, and a second end defined within the interior of the modular acoustic block, wherein the linear axis of the first chamber is approximately perpendicular to the exterior surface of the face wall; and
the second chamber connects to the second end of the first chamber and extends about a linear axis that is approximately parallel to the exterior surface of the face wall.

14. The exhaust processing system according to claim 13, wherein a length of the linear interior cavities is determined as a length of the single chamber;
wherein a length of the bent interior cavities is determined as a combined length of the first and second chambers;
wherein, for each modular acoustic block of the modular acoustic blocks, the different lengths of the interior cavities comprise a range between 0.5 inches to 15 inches.

15. The exhaust processing system according to claim 11, wherein the at least one of the passageway walls against which the acoustic liner is formed comprises the passageway walls within the exhaust duct; and
wherein the targeted sound frequencies comprise a range of between 400-3,000 Hz.

16. The exhaust processing system according to claim 11, wherein the at least one of the passageway walls against which the acoustic liner is formed comprises the passageway walls within each of the transition section and the downstream section of the exhaust duct.

17. The exhaust processing system according to claim 11, wherein the at least one of the passageway walls against which the acoustic liner is formed comprises the passageway walls within each of the exhaust duct and the stack; and
wherein each modular acoustic block of the modular acoustic blocks is constructed from at least one of a ceramic matrix composite material and a stainless-steel alloy.

18. An acoustic liner comprising uniformly configured modular acoustic blocks fitted against each other;
wherein each modular acoustic block of the modular acoustic blocks comprises exterior and interior walls;
wherein, for each modular acoustic block of the modular acoustic blocks:
the exterior walls include opposing face and aft walls and, extending between the face and aft walls, sidewalls;
the interior walls extend between the exterior walls and divide an interior of the respective modular acoustic block into interior cavities that extend lengthwise between respective openings defined through the face wall and respective termination points defined within the interior of the modular acoustic block; and
the interior cavities having lengths varied across a range of lengths for dampening a targeted range of sound frequencies;
wherein the acoustic liner is formed against and covers at least one passageway wall defining an exhaust passageway of a gas turbine engine;
wherein a cluster of the modular acoustic blocks is repeated throughout the acoustic liner, the cluster comprising:
a center one of the modular acoustic blocks; and
adjacent ones of the modular acoustic blocks that surround and are adjacent to the center one of the modular acoustic blocks;
wherein, within the cluster, the sidewalls of the center one of the modular acoustic blocks each abuts a corresponding one of the sidewalls of the adjacent ones of the modular acoustic blocks;
wherein each modular acoustic block of the cluster comprises an interlocking mechanism that, within the cluster, connects the center one of the modular acoustic blocks to the adjacent ones of the modular acoustic blocks; and wherein the interlocking mechanism comprises a tab protruding from a first one of the sidewalls and a slot formed within a second one of the sidewalls, the tab and slot of the center one of the modular acoustic blocks being adapted to cooperate with the slot and tab, respectively, of the adjacent ones of the modular acoustic blocks.

19. The acoustic liner according to claim 18, wherein each modular acoustic block of the modular acoustic blocks includes:

exterior surfaces of the face wall and aft wall being planar and parallel to each other;

the sidewalls defining a cross-sectional shape of the modular acoustic blocks that is constant between the face wall and the aft wall;

wherein the cross-section shape of the modular acoustic blocks each comprises a polygon having three or more linear sides, each of the three or more linear sides corresponding to one of the sidewalls; and wherein the acoustic liner comprises a single layer of the modular acoustic blocks fitted together so that, within the cluster, no gaps remain between the center one of the modular acoustic blocks and the adjacent ones of the modular acoustic block.

* * * * *